US011754016B2

(12) United States Patent
Saito et al.

(10) Patent No.: US 11,754,016 B2
(45) Date of Patent: Sep. 12, 2023

(54) FUEL INJECTION CONTROL DEVICE AND FUEL INJECTION CONTROL METHOD FOR INTERNAL COMBUSTION ENGINE

(71) Applicant: Hitachi Astemo, Ltd., Hitachinaka (JP)

(72) Inventors: Kazuya Saito, Hitachinaka (JP); Hiroshi Miyamoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/908,267

(22) PCT Filed: Mar. 9, 2021

(86) PCT No.: PCT/JP2021/009260
§ 371 (c)(1),
(2) Date: Aug. 31, 2022

(87) PCT Pub. No.: WO2021/187234
PCT Pub. Date: Sep. 23, 2021

(65) Prior Publication Data
US 2023/0119411 A1 Apr. 20, 2023

(30) Foreign Application Priority Data
Mar. 16, 2020 (JP) ................................ 2020-045102

(51) Int. Cl.
*F02D 41/40* (2006.01)
*F02D 41/00* (2006.01)
*F02D 41/38* (2006.01)

(52) U.S. Cl.
CPC ......... *F02D 41/402* (2013.01); *F02D 41/008* (2013.01); *F02D 2041/389* (2013.01)

(58) Field of Classification Search
CPC . F02D 41/402; F02D 41/008; F02D 2041/389
See application file for complete search history.

(56) References Cited

U.S. PATENT DOCUMENTS 4,979,481 A * 12/1990 Shimomura ............ F02D 41/22
  123/690
6,244,241 B1 * 6/2001 Mamiya .............. F02D 41/2461
  123/295

(Continued)

FOREIGN PATENT DOCUMENTS

JP 11-343911 A 12/1999
JP 2003-27995 A 1/2003

(Continued)

OTHER PUBLICATIONS

International Preliminary Report on Patentability (PCT/IB/338 & PCT/IB/373) issued in PCT Application No. PCT/JP2021/009260 dated Sep. 29, 2022, including English translation of document C2 (Japanese-language Written Opinion (PCT/ISA/237) filed on Aug. 31, 2022) (10 pages).

(Continued)

*Primary Examiner* — John Kwon
(74) *Attorney, Agent, or Firm* — Crowell & Moring LLP

(57) ABSTRACT

A fuel injection control device and a fuel injection control method for an internal combustion engine according to the present invention correct a basic pulse width by a cylinder-specific correction value that is based on injection variations among fuel injection valves to specify a cylinder-specific pulse width, determine whether or not a split number is acceptable based on a minimum pulse width and a pulse width per one injection calculated from the cylinder-specific pulse width and the split number to modify the split number based on a result of the acceptance determination, modify an acceptance determination reference value which is used in the acceptance determination based on the correction value for each cylinder, and execute split injection based on the split number, the basic pulse width, and the correction value for each cylinder.

7 Claims, 14 Drawing Sheets

(56) References Cited

U.S. PATENT DOCUMENTS

| | | | |
|---|---|---|---|
| 6,962,140 B1 | 11/2005 | Nakai et al. | |
| 2003/0037771 A1* | 2/2003 | Yuya | F02D 41/047 |
| | | | 123/491 |
| 2007/0215131 A1* | 9/2007 | Nakazawa | F02D 41/10 |
| | | | 123/696 |
| 2010/0017100 A1* | 1/2010 | Yamamoto | F02D 41/3076 |
| | | | 701/104 |
| 2016/0237937 A1 | 8/2016 | Kusakabe et al. | |

FOREIGN PATENT DOCUMENTS

| | | |
|---|---|---|
| JP | 2008-101625 A | 5/2008 |
| JP | 2015-63928 A | 4/2015 |
| JP | 2017-133438 A | 8/2017 |

OTHER PUBLICATIONS

International Search Report (PCT/ISA/210) issued in PCT Application No. PCT/JP2021/009260 dated May 25, 2021 with English translation (four (4) pages).

Japanese-language Written Opinion (PCT/ISA/237) issued in PCT Application No. PCT/JP2021/009260 dated May 25, 2021 (four (4) pages).

\* cited by examiner

FIG.9

| CYLINDER | TIA | CM | TIB | Tmin | M (INITIAL VALUE) | DF | TH | M (FINAL VALUE) |
|---|---|---|---|---|---|---|---|---|
| #1 (LOWER END ONE) | 1210 | -30 | 1180 | 400 | 3 | 0.99 | 1.0 | 3 |
| #2 (MEDIAN ONE) | 1210 | 0 | 1210 | 400 | 3 | 0.99 | 1.0 | 3 |
| #3 (UPPER END ONE) | 1210 | 30 | 1240 | 400 | 3 | 0.99 | 1.0 | 3 |
| #4 | 1210 | 10 | 1220 | 400 | 3 | 0.99 | 1.0 | 3 |

FIG.12

| CYLINDER | TIA | CM | TIB | Tmin | M (INITIAL VALUE) | DF | TH | M (FINAL VALUE) |
|---|---|---|---|---|---|---|---|---|
| #1 (LOWER END ONE) | 1210 | -30 | 1180 | 400 | 3 | 1.02 | 1.03 | 3 |
| #2 (MEDIAN ONE) | 1210 | 0 | 1210 | 400 | 3 | 0.99 | 1.00 | 3 |
| #3 (UPPER END ONE) | 1210 | 30 | 1240 | 400 | 3 | 0.97 | 0.98 | 3 |
| #4 | 1210 | 10 | 1220 | 400 | 3 | 0.98 | 0.99 | 3 |

FIG.14

| CYLINDER | T1A | CM | T1B | Tmin | M (INITIAL VALUE) | DF | TH | M (FINAL VALUE) |
|---|---|---|---|---|---|---|---|---|
| #1 (BEFORE LEARNING) | 1210 | 0 | 1210 | 600 | 3 | 1.49 | 1.00 | 2 |
| #2 (AFTER LEARNING) | 1210 | −30 | 1180 | 400 | 3 | 1.02 | 1.03 | 3 |

FIG.16

| CYLINDER | TIA | CM | TIB | Tmin | M (INITIAL VALUE) | DF | TH | M (FINAL VALUE) |
|---|---|---|---|---|---|---|---|---|
| #1 (BEFORE LEARNING) | — | — | — | 600 | — | — | — | — |
| #1 (BEFORE LEARNING) | 1210 | 0 | 1210 | 400 | 3 | 0.99 | 0.67 | 2 |
| #1 (AFTER LEARNING) | 1210 | −30 | 1180 | 400 | 3 | 1.02 | 1.03 | 3 |

FUEL INJECTION CONTROL DEVICE AND FUEL INJECTION CONTROL METHOD FOR INTERNAL COMBUSTION ENGINE

TECHNICAL FIELD

The present invention relates to a fuel injection control device and to a fuel injection control method for an internal combustion engine.

BACKGROUND ART

A diesel engine control system disclosed in Patent Document 1 conducts split fuel injection in an idling operating state to learn the electric current supply period of a first injection step, in which a idling state is stabilized. The learned values are updated and stored as the electric current supply period corresponding to a prescribed injection amount per injection step.

REFERENCE DOCUMENT LIST

Patent Document

Patent Document 1: JP 2003-027995 A

SUMMARY OF THE INVENTION

Problem to be Solved by the Invention

Fuel injection valves have varying injection performance (in other words, there are differences among individual valves) due to, for example, variations in valve-closing responses. In an internal combustion engine comprising a plurality of cylinders, each of which is provided with a fuel injection valve, even if a drive pulse signal with the same pulse width is provided for each fuel injection valve, there may be variations in actual injection amounts of fuel among individual cylinders, resulting in variations in air-fuel ratios among cylinders.

Variations in the air-fuel ratios among cylinders described above can be suppressed by correcting the pulse width for each cylinder based on variations in injection among the fuel injection valves.

On the other hand, in the case of split injection, the number of injections or the number of times of injections in each combustion cycle (split number) is set so that the pulse width per one injection is not shorter than a minimum pulse width that is the lower limit of the pulse width of a drive pulse signal.

If split injection is conducted in a fuel injection control process and the pulse width for each cylinder is corrected based on variations in injection, the split numbers may differ depending on each cylinder due to difference in the pulse width among the cylinders, and this may result in differences in combustion performance among cylinders.

The present invention has been made in view of such conventional circumstances, and an object thereof is to provide a fuel injection control device and a fuel injection control method for an internal combustion engine that can suppress variations in air-fuel ratios among cylinders due to injection variations among the fuel injection valves and also prevent the split numbers from differing among the cylinders.

Means for Solving the Problem

A fuel injection control device for an internal combustion engine according to an aspect of the present invention comprises: a basic pulse width setting unit that determines a basic pulse width of a drive pulse signal to be output to fuel injection valves based on an operation state of the internal combustion engine; a pulse width correcting unit that corrects the basic pulse width by a cylinder-specific correction value that is based on injection variations among the fuel injection valves and sets a cylinder-specific pulse width; a split number setting unit for setting a split number of split injection, which is configured to determine whether or not the split number is acceptable based on a pulse width per one injection calculated from the cylinder-specific pulse width and the split number and on a minimum pulse width that is the lower limit of the pulse width of the drive pulse signal, to modify the split number based on a result of the acceptance determination, and to modify an acceptance determination reference value which is used in the acceptance determination based on the correction value for each cylinder; and a split injection controlling unit that executes split injection based on the split number, the basic pulse width, and the correction value for each cylinder.

A fuel injection control method for an internal combustion engine according to an aspect of the present invention comprises: a first step of determining a basic pulse width of a drive pulse signal to be output to fuel injection valves based on an operation state of the internal combustion engine; a second step of correcting the basic pulse width by a cylinder-specific correction value that is based on injection variations among the fuel injection valves and setting a cylinder-specific pulse width; a third step of setting a split number of split injection, which comprises determining whether or not the split number is acceptable based on the pulse width per one injection calculated from the cylinder-specific pulse width and the split number and on a minimum pulse width that is the lower limit of the pulse width of the drive pulse signal, modifying the split number based on a result of the acceptance determination, and modifying an acceptance determination reference value which is used in the acceptance determination based on the correction value for each cylinder; and a fourth step of executing split injection based on the split number, the basic pulse width, and the correction value for each cylinder.

Effects of the Invention

According to the above invention, it is possible to suppress variations in air-fuel ratios among cylinders due to injection variations among the fuel injection valves and also prevent the split numbers from differing among the cylinders.

BRIEF DESCRIPTION OF THE DRAWINGS

FIG. 9 is a table showing examples of correction of the pulse width and the split number according to the first embodiment.

FIG. 12 is a table showing examples of a cylinder-specific determination value TH(n) and a cylinder-specific correction value CM(n) according to the second embodiment.

FIG. 14 is a table showing an example of switching and setting of a minimum pulse width Tmin and determination value TH(n) according to the third embodiment.

FIG. 16 is a table showing an example of switching and setting of determination value TH(n) according to the fourth embodiment.

MODES FOR CARRYING OUT THE INVENTION

An embodiment of the present invention will be described below.

Figure 1:
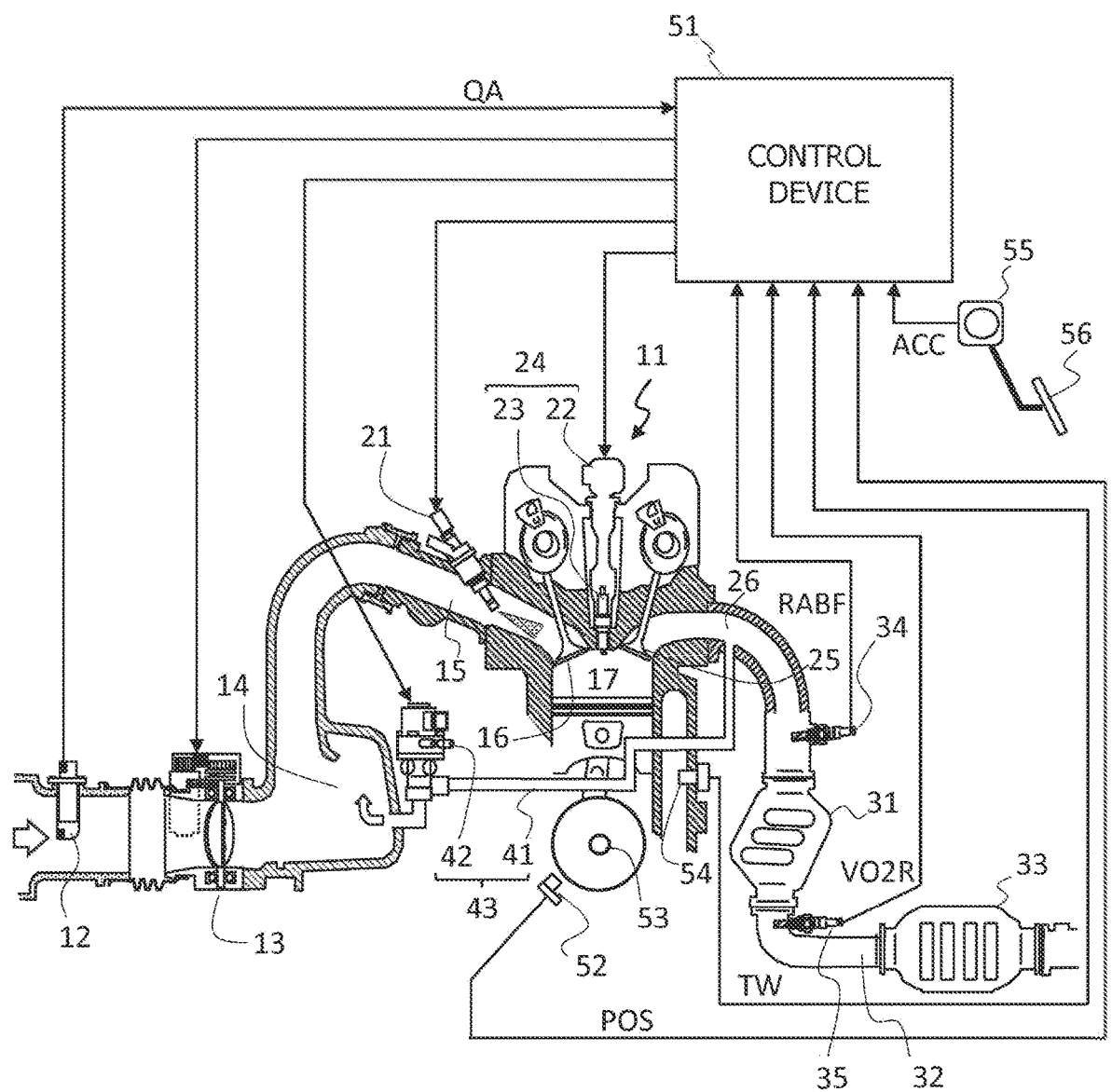
FIG. 1 is a system configuration diagram of an internal combustion engine.

FIG. 1 is a system configuration diagram illustrating an aspect of an internal combustion engine that comprises a plurality of cylinders, and fuel injection valves (in other words, fuel injection devices) provided respectively for the plurality of cylinders.

An internal combustion engine 11 in FIG. 1 is a four-cycle inline four-cylinder engine and is mounted as a power source in a vehicle (not shown).

It should be noted that the engine is not limited to an in-line engine, and it may be a V-type engine or a horizontally-opposed type engine. Also, the number of cylinders is not limited to four.

The intake air passes through an air flow meter 12, an electronically controlled throttle valve 13, and a collector 14 in this order, and then is drawn into a combustion chamber 17 provided in each cylinder through an intake pipe 15 and an intake valve 16 of each cylinder.

An electromagnetic fuel injection valve 21 is provided at intake pipe 15 of each cylinder, and it injects fuel into intake pipe 15, in other words, the intake port of each cylinder.

Internal combustion engine 11 may be an in-cylinder direct injection internal combustion engine that is configured such that fuel injection valve 21 directly injects fuel into combustion chamber 17.

Internal combustion engine 11 further includes an ignition device 24 for each cylinder, and each ignition device 24 has an ignition coil 22 and a spark plug 23.

In each combustion chamber 17, air-fuel mixture is ignited by a spark of spark plug 23, and combustion takes place. The exhaust gas produced by the combustion in combustion chamber 17 flows out to an exhaust pipe 26 provided in each cylinder through an exhaust valve 25.

Internal combustion engine 11 comprises a first catalytic device 31 and a second catalytic device 33, each of which includes a three-way catalyst for purifying exhaust gas.

First catalytic device 31 is disposed immediately below the junction of exhaust pipes 26. Second catalytic device 33 is disposed in an exhaust duct 32 downstream of first catalytic device 31.

Internal combustion engine 11 further includes an air-fuel ratio sensor 34 and an oxygen sensor 35. Air-fuel ratio sensor 34 is provided upstream of first catalytic device 31 and is configured to output a detection signal RABF corresponding to an air-fuel ratio at a point upstream of first catalytic device 31. Oxygen sensor 35 is provided downstream of first catalytic device 31 and is configured to output a detection signal VO2R indicative of richness and leanness of the exhaust gas air-fuel ratio with respect to a theoretical air-fuel ratio at a point downstream of first catalytic device 31.

Internal combustion engine 11 further includes an exhaust gas recirculation device 43 having an exhaust gas recirculation pipe 41 and an exhaust gas recirculation control valve 42. Exhaust gas recirculation pipe 41 connects exhaust pipe 26 with collector 14 in communication. Exhaust gas recirculation control valve 42 is configured to adjust the opening area of exhaust gas recirculation pipe 41 to control the exhaust gas recirculation rate.

Control device 51 is an electronic controller that includes a microcomputer having a microprocessor and a memory.

Control device 51 has a function of controlling internal combustion engine 11 in the form of software, which includes performing arithmetic processing on detection signals output by various sensors, determining manipulated variables related to fuel injection from fuel injection valves 21, the opening degree of electronically controlled throttle valve 13, the ignition by spark plugs 23, the opening degree of exhaust gas recirculation control valve 42, and the like, and outputting control signals corresponding to the manipulated variables.

Thus, control device 51 is a fuel injection control device for controlling fuel injection by fuel injection valves 21, and it executes fuel injection control.

Control device 51 receives detection signal RABF from air-fuel ratio sensor 34 and detection signal VO2R from oxygen sensor 35 described above.

Control device 51 also receives a detection signal from air flow meter 12 that indicates an intake air flow rate QA of internal combustion engine 11, a detection signal from a crank angle sensor 52 that indicates a rotational angle position POS of a crankshaft 53, a detection signal from a water temperature sensor 54 that indicates a coolant temperature TW of internal combustion engine 11, and a detection signal from an accelerator position sensor 55 indicative of an accelerator opening ACC that correlates with how much an accelerator pedal 56 is depressed.

Control device 51 calculates an engine rotation speed NE based on rotational angle position POS of crankshaft 53 and determines engine load based on intake air flow rate QA and engine rotation speed NE.

Control device 51 then calculates a target ignition timing and a target exhaust gas recirculation rate in accordance with engine operating conditions such as the engine load, engine rotation speed NE, and coolant temperature TW, and it outputs ignition control signals for controlling power supply to ignition coils 22 in accordance with their respective target ignition timing, and outputs an opening degree control signal to exhaust gas recirculation control valve 42 in accordance with the target exhaust gas recirculation rate.

Furthermore, control device 51 calculates a target throttle opening degree of electronically controlled throttle valve 13 based on accelerator opening ACC and the like, and controls electronically controlled throttle valve 13 in accordance with the target opening degree.

Furthermore, control device 51 controls the pulse width (in other words, a period of time of control to open a valve based on an injection pulse signal) of drive pulse signals for driving fuel injection valves 21 to open, thereby controls the amounts of fuel injected by fuel injection valves 21, and further, the air-fuel ratio of each cylinder.

When the electromagnetic coil of fuel injection valve 21 is energized during a period in which the drive pulse signal is high, the magnetic attraction force of the electromagnetic coil lifts the valve body against valve-closing urging force of the spring, and fuel injection valve 21 opens to inject fuel into internal combustion engine 11.

Control device 51 specifies the pulse width of drive pulse signals for fuel injection valves 21 as described below.

Control device 51 calculates a basic pulse width TIA (μs), which is for controlling the air-fuel ratio of internal combustion engine 11 so as to be a target air-fuel ratio and is the same for each cylinder (each fuel injection valve 21), based on engine operating conditions of internal combustion engine 11 such as engine rotation speed NE, and intake air flow rate QA.

Furthermore, control device 51 corrects basic pulse width TIA by a cylinder-specific correction value CM(n) (μs) for compensating injection variations among fuel injection valves 21 provided respectively for each cylinder, and sets a cylinder-specific pulse width TIB(n) (μs) (TIB(n)=TIA+CM(n): n=1, 2, 3, 4).

Control device 51 then outputs a drive pulse signal with the corresponding cylinder-specific pulse width TIB(n) to each fuel injection valve 21 at a predetermined injection timing to make each fuel injection valve 21 to inject fuel in an amount proportional to their respective cylinder-specific pulse width TIB(n).

Injection variations among fuel injection valves 21 correspond to variations in the actual amounts of fuel injection among fuel injection valves 21 when they are provided with a drive pulse signal which has the same pulse width. Such variations occur due to, for example, valve-closing variations, which occur in response time or a period of time from when the drive pulse signal is switched from a high state (in other words, a state controlled to be on, or a state controlled to open) to a low state (in other words, a state controlled to be off, or a state controlled to close) until the time when fuel injection valve 21 actually closes.

Figure 2:
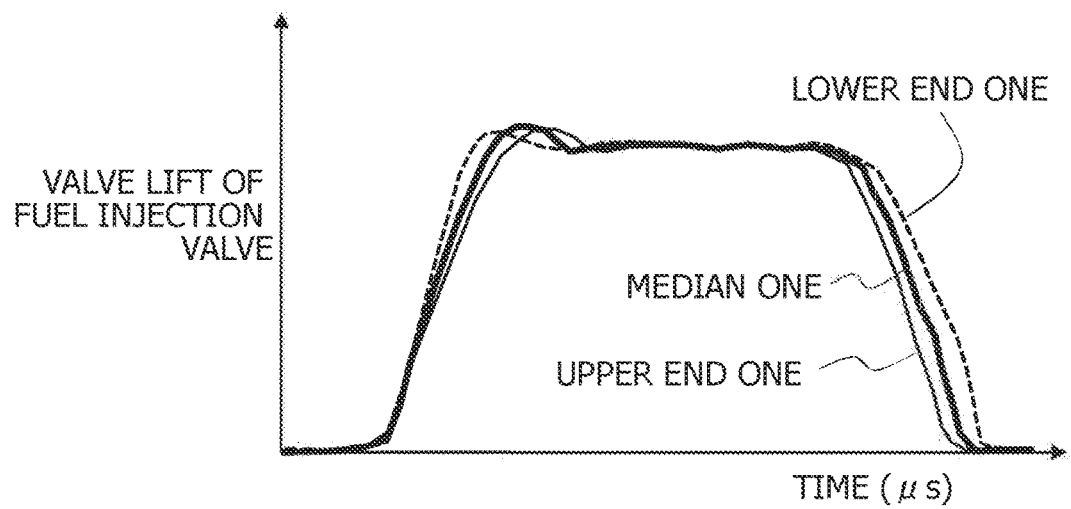
FIG. 2 illustrates variations in valve-closing response times among fuel injection valves.

FIG. 2 illustrates an example of variations in valve-closing response times among fuel injection valves 21.

The valve-closing response time, which is a period of time from when the state controlled to open is switched to the state controlled to close until the time when fuel injection valve 21 actually turns into the closed valve state, varies due to variations in the spring loading of springs that urge the valve body of fuel injection valve 21 in a direction of closed valve.

In FIG. 2, fuel injection valves 21 having a lower end value of spring loading is referred to as lower end one, that having a median value of spring loading (in other words, a design value) is referred to as median one, and that having an upper end value of spring loading is referred to as upper end one.

FIG. 2 illustrates that as the spring loading becomes lower, the valve-closing response time becomes longer, and as the spring loading becomes higher, the valve-closing response time becomes shorter.

Figure 3:
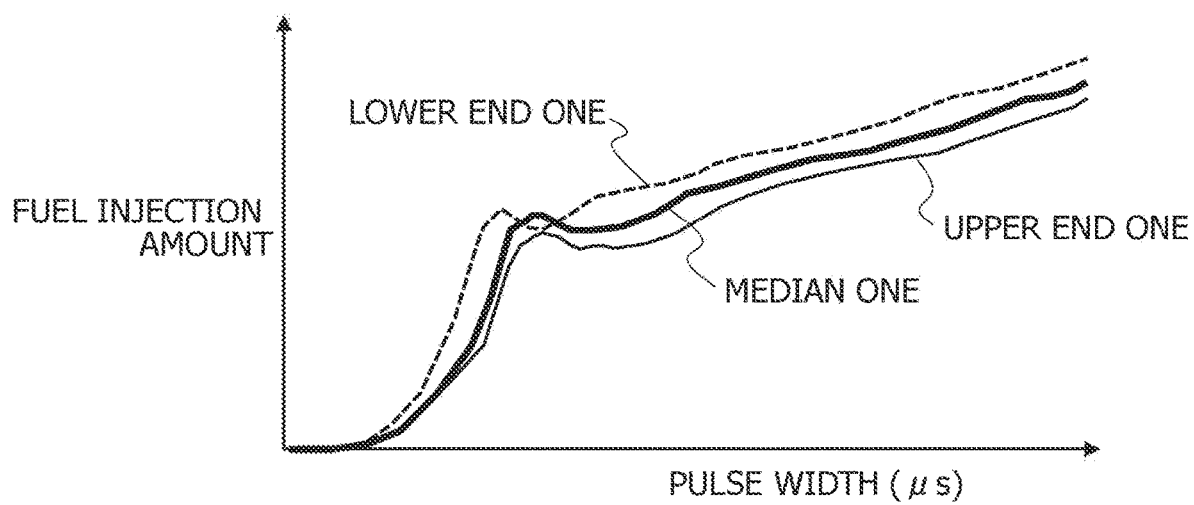
FIG. 3 illustrates injection variations due to variations in valve-closing response times among fuel injection valves.

FIG. 3 illustrates an example of variations in the amounts of injected fuel among fuel injection valves 21 due to variations in valve-closing response times among fuel injection valves 21.

Variations in valve-closing response times among fuel injection valves 21 cause increase or decrease in the actual amounts of injected fuel by an amount corresponding to the time difference. This results in variations in the amounts of fuel injected from fuel injection valves 21, leading to variations in air-fuel ratios among the cylinders.

Specifically, the injection amount of fuel injection valve 21 having a lower end value of spring loading (lower end one) uniformly shifts upward compared to that of fuel injection valve 21 having a median value of spring loading (median one) since fuel injection valve 21 of lower end one has a longer valve-closing response time.

On the other hand, the injection amount of fuel injection valve 21 having an upper end value of spring loading (upper end one) uniformly shifts downward compared to that of fuel injection valve 21 having a median value of spring loading (median one) since fuel injection valve 21 of upper end one has a shorter valve-closing response time.

Therefore, control device 51 functions as a correction value learning unit that measures a period of time from when the state controlled to open is switched to the state controlled to close until the actual valve-closing timing as a valve-closing response time of fuel injection valve 21 and that learns cylinder-specific correction value CM(n) based on the measured valve-closing response time.

Furthermore, control device 51 corrects basic pulse width TIA so as to increase or decrease, based on cylinder-specific correction value CM(n), and specifies cylinder-specific pulse width TIB(n). This suppresses variations in the amounts of injected fuel of fuel injection valves 21 among cylinders and makes variations in air-fuel ratios among the cylinders smaller, even if there are variations in the valve-closing response times among fuel injection valves 21.

Control device 51 measures the valve-closing timing of fuel injection valves 21 by detecting changes in the acceleration of an anchor of fuel injection valves 21 based on changes in the driving voltage, for example.

Figure 4:
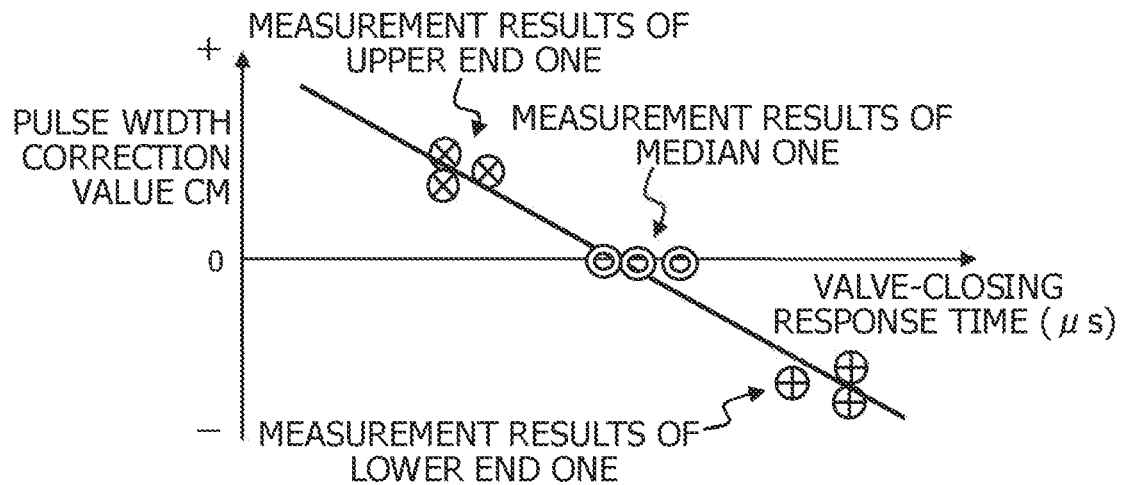
FIG. 4 is a diagram illustrating the correlation between the valve-closing response time and a correction value of a pulse width.

FIG. 4 illustrates an example of the correlation between variations in the valve-closing response times among fuel injection valves 21 and cylinder-specific correction value CM(n).

Among fuel injection valves 21 for the cylinders of internal combustion engine 11, control device 51 specifies zero as correction value CM(n) for the median one having the median value of spring loading, specifies a negative value as correction value CM(n) for the lower end one, which has the lower end value of spring loading and injects fuel in a greater amount than the median one, and specifies a positive value as correction value CM(n) for the upper end one, which has the upper end value of spring loading and injects fuel in a smaller amount than the median one, for example.

Figure 5:
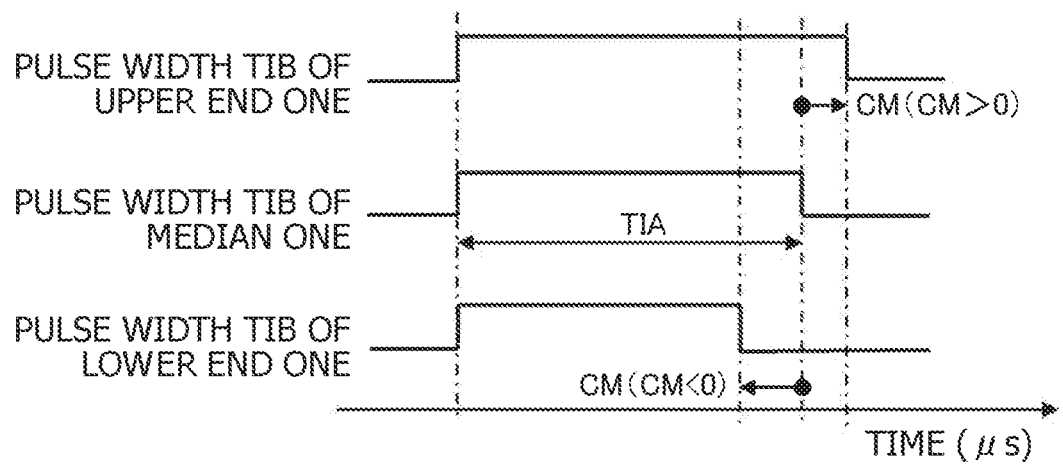
FIG. 5 is a diagram illustrating correction of the pulse widths based on variations in spring loading.

FIG. 5 is a diagram illustrating examples of cylinder-specific pulse width TIB(n) obtained by correcting basic pulse width TIA with cylinder-specific correction value CM(n) learned as described above.

Cylinder-specific pulse width TIB(n) of fuel injection valve 21 of the median one having the median value of spring loading is set to be the same as basic pulse width TIA since correction value CM(n) is specified as zero (CM(n)=0).

On the other hand, cylinder-specific pulse width TIB(n) of fuel injection valve 21 of the upper end one, the spring loading of which is higher than the median value, is set to be longer than basic pulse width TIA since correction value CM(n) is a positive value (CM(n)>0).

Furthermore, cylinder-specific pulse width TIB(n) of fuel injection valve 21 of the lower end one, the spring loading of which is lower than the median value, is set to be shorter than basic pulse width TIA since correction value CM(n) is a negative value (CM(n)<0).

The learning of cylinder-specific correction value CM(n) for compensating injection variations among fuel injection valves 21 is not limited to learning based on the measurement of the valve-closing timing (in other words, the measurement of the valve-closing response time) of fuel injection valves 21. For example, control device 51 may learn cylinder-specific correction value CM(n) by calculating injection variations based on measurement results of the air-fuel ratios of individual cylinders, changes in the engine rotation speed, and the like.

As described above, by correcting basic pulse width TIA with cylinder-specific correction value CM(n) to set cylinder-specific pulse width TIB(n), even if there are variations in valve-closing response times among fuel injection valves 21, that is, injection variations among fuel injection valves 21, variations in the amounts of fuel that is injected from each fuel injection valve 21 into each cylinder can be suppressed, and thus, variations in air-fuel ratios among cylinders can also be suppressed.

Next, the correlation between minimum pulse width Tmin, which is the lower limit of the pulse width for variations in air-fuel ratios among cylinders to be within an acceptable range, and injection variations will be described.

Figure 6:
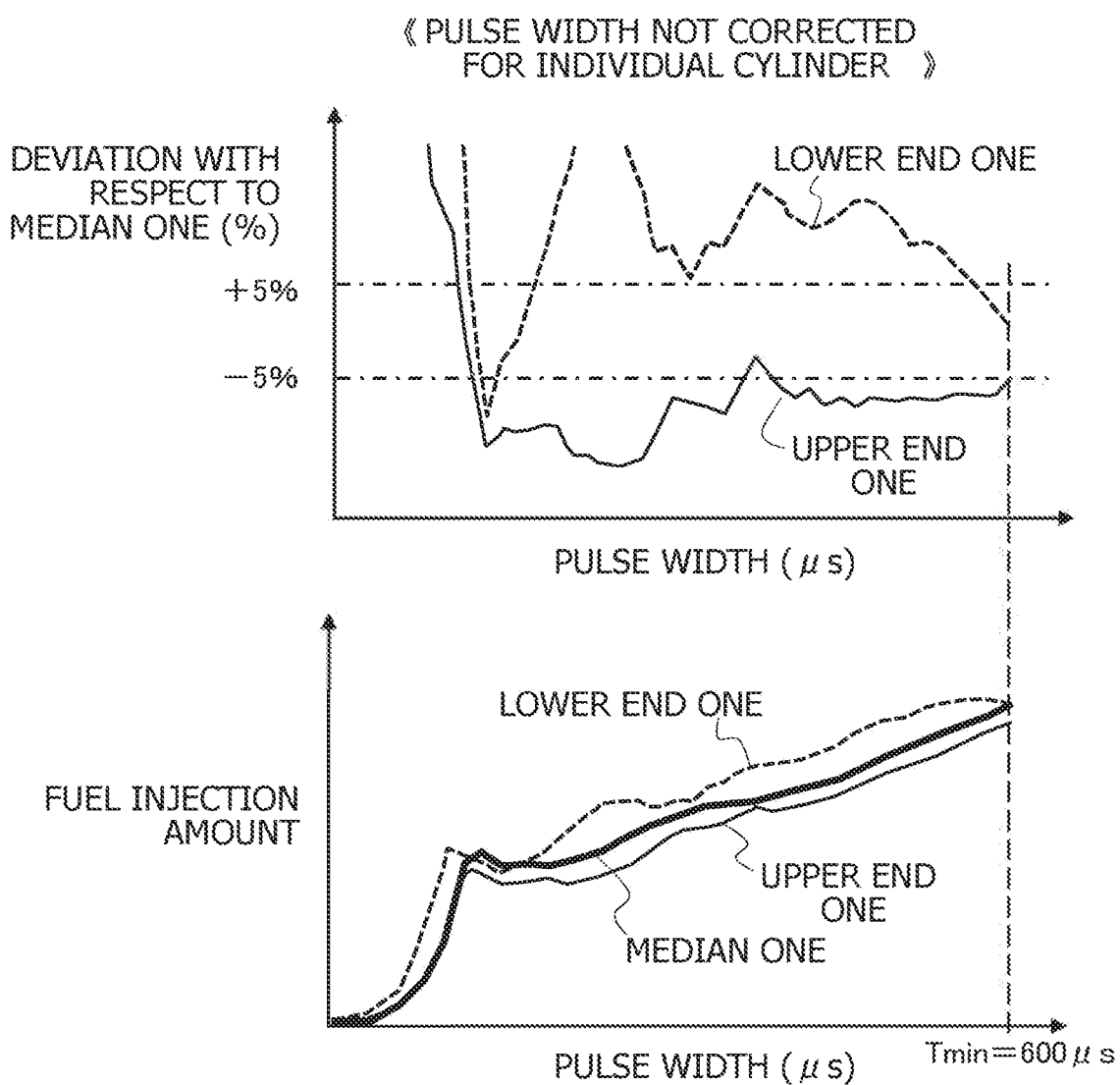
FIG. 6 is a diagram illustrating injection variations when the pulse width is not corrected for each cylinder.
Figure 7:
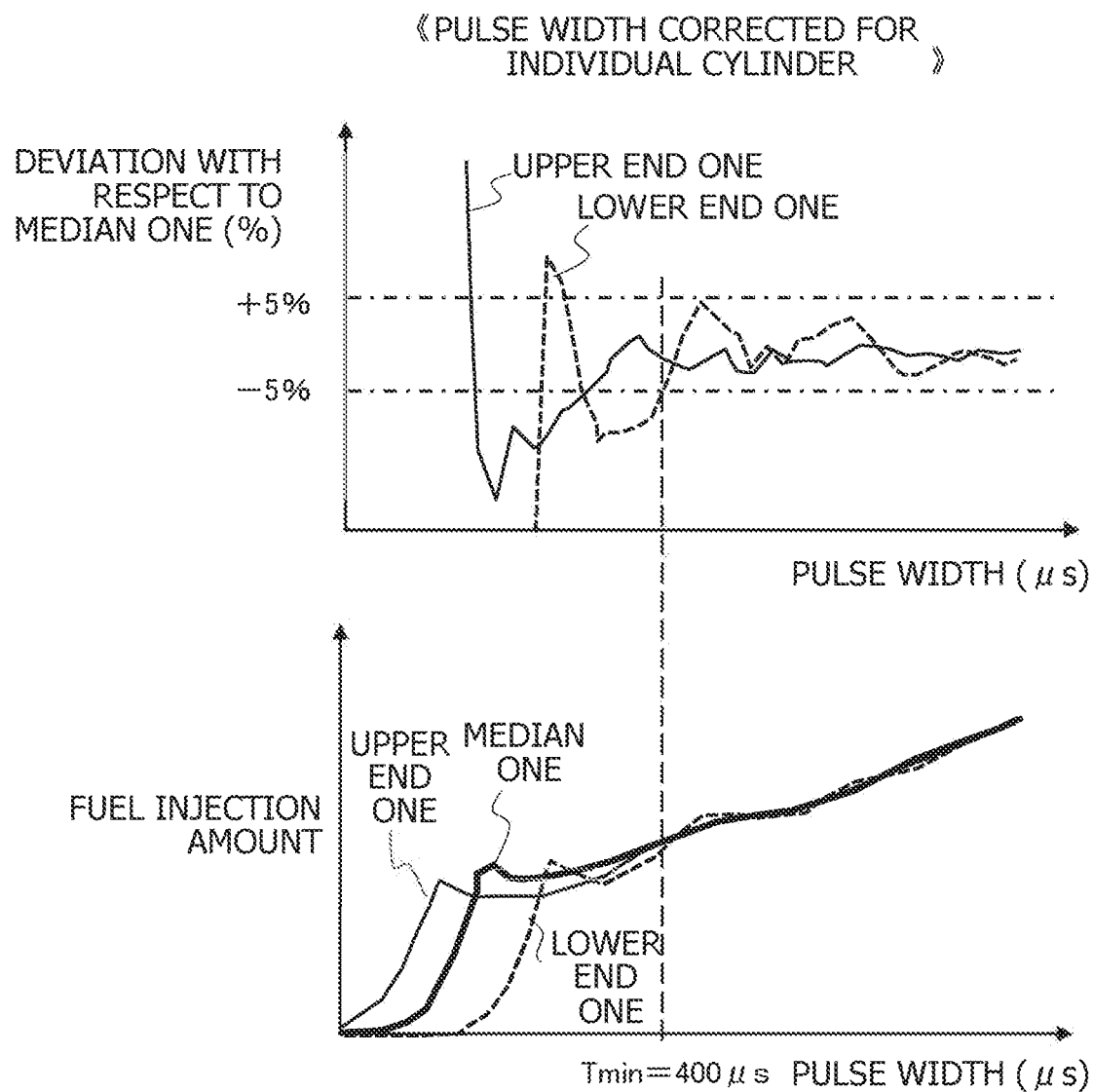
FIG. 7 is a diagram illustrating injection variations when the pulse width is corrected for each cylinder.

FIG. 6 and FIG. 7 illustrate the correlation between deviations D (%) of the amounts of injected fuel of the lower end one and upper end one with respect to that of the median one, and the pulse width. FIG. 6 illustrates a case in which fuel is injected from each fuel injection valve 21 based on basic pulse width TIA. FIG. 7 illustrates a case in which fuel is injected from each fuel injection valve 21 based on cylinder-specific pulse width TIB(n) that is specified by correcting basic pulse width TIA with cylinder-specific correction value CM(n).

The respective deviation D (%) of the injection amounts of the lower end one and upper end one with respect to that of the median one becomes greater, as the corresponding ratio of the amount of variations in the injection amounts due to variations in the valve-closing response times to the corresponding entire injection amount becomes greater. Deviation D tends to become greater as basic pulse width TIA becomes shorter.

Furthermore, as shown in FIG. 6, if basic pulse widths TIA are 600 μs or longer, deviation D when fuel is injected from each fuel injection valve 21 with basic pulse width TIA is within an acceptable range (for example, within ±5%).

In other words, when fuel is injected from each fuel injection valve 21 with basic pulse widths TIA being shorter than 600 μs, deviation D may exceed the acceptable range, and thus, 600 μs is the lower limit of basic pulse width TIA that makes variations in air-fuel ratios among cylinders to be within the acceptable range (minimum pulse width Tmin).

On the other hand, when fuel is injected based on cylinder-specific pulse width TIB(n) obtained by the correction based on cylinder-specific correction value CM(n), variations in the injection amounts become smaller compared to when fuel is injected based on basic pulse width TIA.

Therefore, in the example shown in FIG. 7, deviation D is within an acceptable range (for example, within ±5%) with basic pulse widths TIA being 400 μs or longer, and thus, 400 μs is minimum pulse width Tmin that can contain variations in air-fuel ratios among cylinders in the acceptable range.

Specifically, when executing fuel injection with cylinder-specific pulse width TIB(n) which is obtained by the correction based on cylinder-specific correction value CM(n), only if basic pulse widths TIA are 400 μs or longer, variations in air-fuel ratios among cylinders (injection variations) may be suppressed within the acceptable range by executing fuel injection with the obtained cylinder-specific pulse width TIB(n).

Thus, executing fuel injection with on cylinder-specific pulse width TIB(n) allows making minimum pulse width Tmin to be shorter while suppressing injection variations compared to when executing fuel injection based on basic pulse width TIA.

Therefore, with split injection in which the amount of injected fuel per one combustion cycle is divided into a plurality of injections, if executing fuel injection based on cylinder-specific pulse width TIB(n), it is possible to increase the split number so as to enhance effects of improving exhaust gas properties, and the like.

Control device 51 executes split injection control in a predetermined operation state of internal combustion engine 11 and sets the split number of split injection based on minimum pulse width Tmin as described below.

Figure 8:
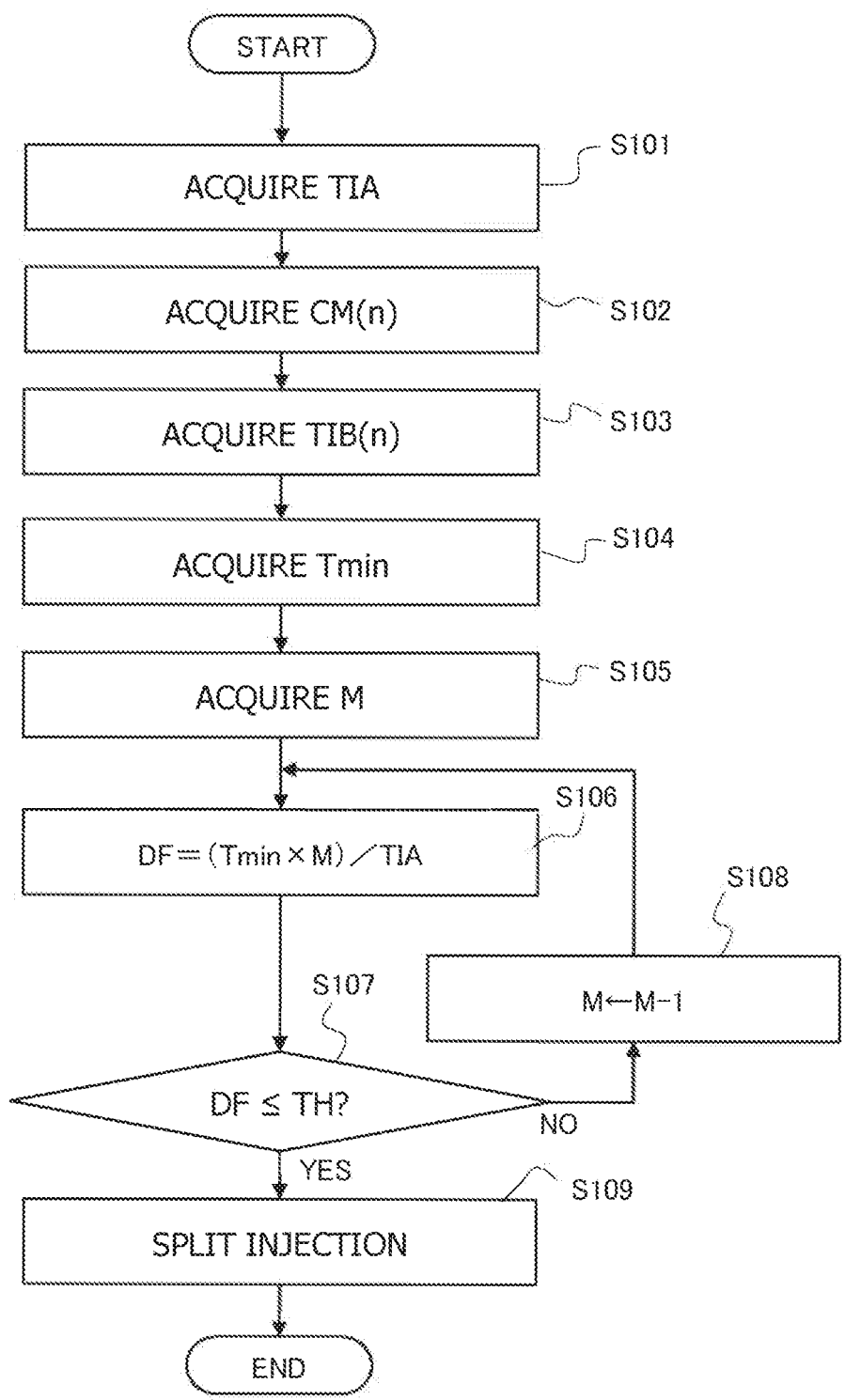
FIG. 8 is a flowchart showing a first embodiment of processing for setting the split number.

FIG. 8 is a flowchart showing the first embodiment of processing for setting the split number.

The processing for setting the split number shown in the flowchart of FIG. 8 is for a case in which internal combustion engine 11 has a fuel-pressure variable system which varies the injection amount from fuel injection valves 21 per unit valve-opening time by changing the pressure of the fuel. When internal combustion engine 11 does not have the above fuel-pressure variable system, the processing for setting the split number may also be conducted in a similar manner.

Control device 51 reads basic pulse width TIA corrected based on the pressure of the fuel in step S101 (basic pulse width setting unit).

Next, in step S102 (correction value acquiring unit), control device 51 reads the learned cylinder-specific correction value CM(n).

In step S103 (pulse width correcting unit), control device 51 calculates cylinder-specific pulse width TIB(n) by correcting basic pulse width TIA with cylinder-specific correction value CM(n).

FIG. 9 illustrates examples of correction of the pulse width and the split number according to the first embodiment.

In examples shown in FIG. 9, fuel injection valve 21 of a first cylinder has the lower end value of spring loading (lower end one), fuel injection valve 21 of a second cylinder has the median value of spring loading (median one), and fuel injection valve 21 of a third cylinder has the upper end value of spring loading (upper end one). Correction value CM(1) of the first cylinder is −30 μs, correction value CM(2) of the second cylinder is 0 μs, correction value CM(3) of the third cylinder is 30 μs, and correction value CM(4) of a fourth cylinder is 10 μs.

Assume here that basic pulse width TIA is 1210 μs. In this case, cylinder-specific pulse width TIB(1) of the first cylinder is calculated to be 1180 μs, cylinder-specific pulse width TIB(2) of the second cylinder is calculated to be 1210 μs, cylinder-specific pulse width TIB(3) of the third cylinder is calculated to be 1240 μs, and cylinder-specific pulse width TIB(4) of the fourth cylinder is calculated to be 1220 μs.

Control device 51 reads minimum pulse width Tmin corresponding to the current fuel pressure in step S104.

For example, control device 51 stores a table showing minimum pulse widths Tmin according to the fuel pressures in a memory and retrieves minimum pulse width Tmin corresponding to the current fuel pressure from the table.

Next, control device 51 sets target split number M of split injection in steps S105 to S108 of a split number setting unit.

First, in step S105, control device 51 sets an initial value of target split number M (in other words, an initial target value of the split number) based on the operation state of internal combustion engine 11.

Figure 10:
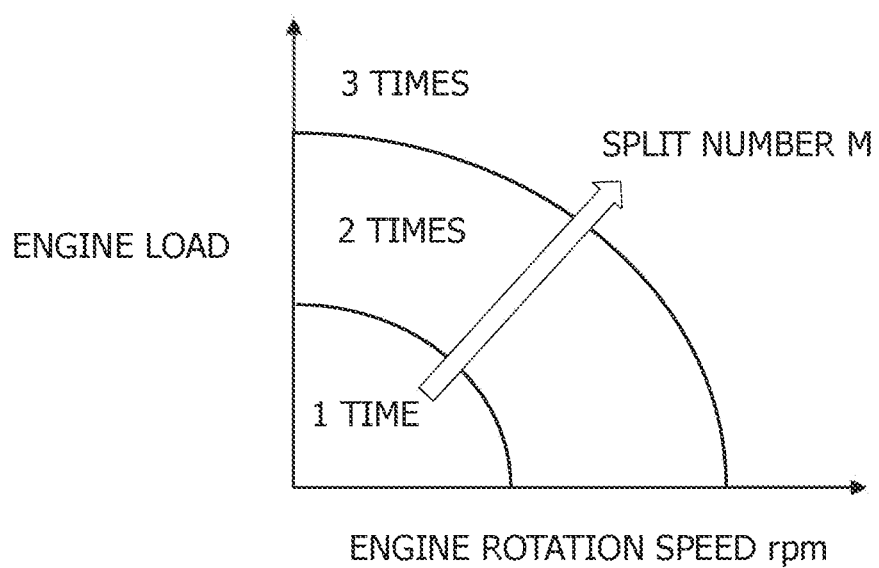
FIG. 10 is a diagram illustrating the correlation between engine load and engine rotation speed, and target split number.

FIG. 10 illustrates the relationship between engine rotation speed NE and the engine load, and the initial value of target split number M, as an embodiment of the initial value of target split number M.

In the example shown in FIG. 10, the initial value of target split number M is specified as 1 in a low-load low-rotation region, the initial value of target split number M is specified as 2 in a middle-load middle-rotation region, and the initial value of target split number M is specified as 3 in a high-load high-rotation region.

Here, target split number M of 1 indicates that split injection is not conducted and that the amount of injected fuel per one combustion cycle is all injected in a single injection.

After control device 51 specifies the initial value of target split number M in step S105, the operation proceeds to step S106, in which control device 51 calculates a split coefficient DF using minimum pulse width Tmin, target split number M, and basic pulse width TIA according to the equation described below.

$$DF=(T\min \times M)/\text{TIA}$$

Next, in step S107, control device 51 compares split coefficient DF calculated in step S106 with a determination value TH (in other words, a determination reference value) and determines whether or not split coefficient DF is equal to or less than determination value TH.

Here, determination value TH is 1.0, and minimum pulse width Tmin is 400 μs as in the example shown in FIG. 7.

If DF≤TH is found, even if basic pulse width TIA is divided equally based on target split number M, the pulse width per one injection is equal to or greater than minimum pulse width Tmin, that is to say that split injection based on target split number M is possible.

On the other hand, if DF≤TH is not found and DF>TH is found, even if basic pulse width TIA is divided equally based on target split number M, the pulse width per one injection is shorter than minimum pulse width Tmin, that is to say that the current target split number M is excessively large.

In examples shown in FIG. 9, minimum pulse width Tmin is 400 μs, the initial value of target split number M is 3, and basic pulse width TIA is 1210 μs. In this case, split coefficient DF is about 0.99, and this satisfies DF≤TH (TH=1.0).

Specifically, basic pulse width TIA, which is 1210 μs, is equally divided into three parts, and one part of the three equally divided parts of basic pulse width TIA (TIA≤400 μs) is corrected by cylinder-specific correction value CM(n) to obtain cylinder-specific pulse width TIB(n). When split injection is conducted based on the obtained cylinder-specific pulse width TIB(n), as shown in FIG. 7, variations in the injection amounts are within an acceptable range (for example, within ±5%).

In other words, satisfying DF≤TH indicates that it is possible to conduct one injection of split injection if a pulse width is equal to minimum pulse width Tmin (Tmin=400 μs) or greater, as shown in FIG. 7.

If it is determined that DF≤TH is satisfied in step S107, control device 51 determines that it is possible to execute split injection based on target split number M used in the calculation of split coefficient DF in step S106, and the operation proceeds to step S109 (split injection controlling unit), in which control device 51 carries out split injection for each cylinder.

In split injection of step S109, if target split number M is 3, for example, the pulse width obtained by equally dividing basic pulse width TIA at the time into three parts is corrected by cylinder-specific correction value CM(n) to obtain cylinder-specific pulse width TIB(n) per one injection of split injection, and three successive injections are carried out based on the obtained cylinder-specific pulse width TIB(n) for each fuel injection valve 21.

For example, if the pulse width obtained by equally dividing basic pulse width TIA into three parts is 400 μs, in FIG. 7, three successive injections are to be conducted in each cylinder based on the corresponding cylinder-specific pulse width TIB(n) on the condition of minimum pulse width Tmin being 400 μs. Accordingly, it is possible to execute split injection in each cylinder based on the same split number while suppressing injection variations among cylinders to be sufficiently small.

On the other hand, if it is determined that DF>TH, control device 51 determines that it is impossible to execute split injection based on target split number M used in the calculation of split coefficient DF in step S106 since basic pulse width TIA per one injection of the split injection is shorter than 400 μs. The operation then proceeds to step S108.

Control device 51 performs processing for updating target split number M to decrease by one in step S108, and the operation then returns to step S106, in which control device 51 calculates split coefficient DF again based on the updated target split number M which has been decreased by one.

Decreasing target split number M results in an increase in the pulse width per one injection of split injection. Thus, the updating processing to decrease target split number M is processing for modifying target split number M in a direction of satisfying DF≤TH.

The operation proceeds to step S107 again, in which control device 51 compares split coefficient DF calculated based on the target split number M which has been decreased by one, with determination value TH. If the condition of this target split number M satisfies DF≤TH, control device 51 determines that it is possible to execute split injection based on this target split number M, and the operation then proceeds to step S109.

In other words, control device 51 determines whether or not target split number M is acceptable based on minimum pulse width Tmin and the pulse width per one injection of split injection calculated from basic pulse width TIA and target split number M, and control device 51 ultimately sets target split number M based on the result of the acceptance determination.

This makes it possible to conduct split injection based on the split number that is as close as possible to the initial value of target split number M according to the operation state of internal combustion engine 11 as well as based on the pulse width that can sufficiently suppress injection variations.

Figure 11:
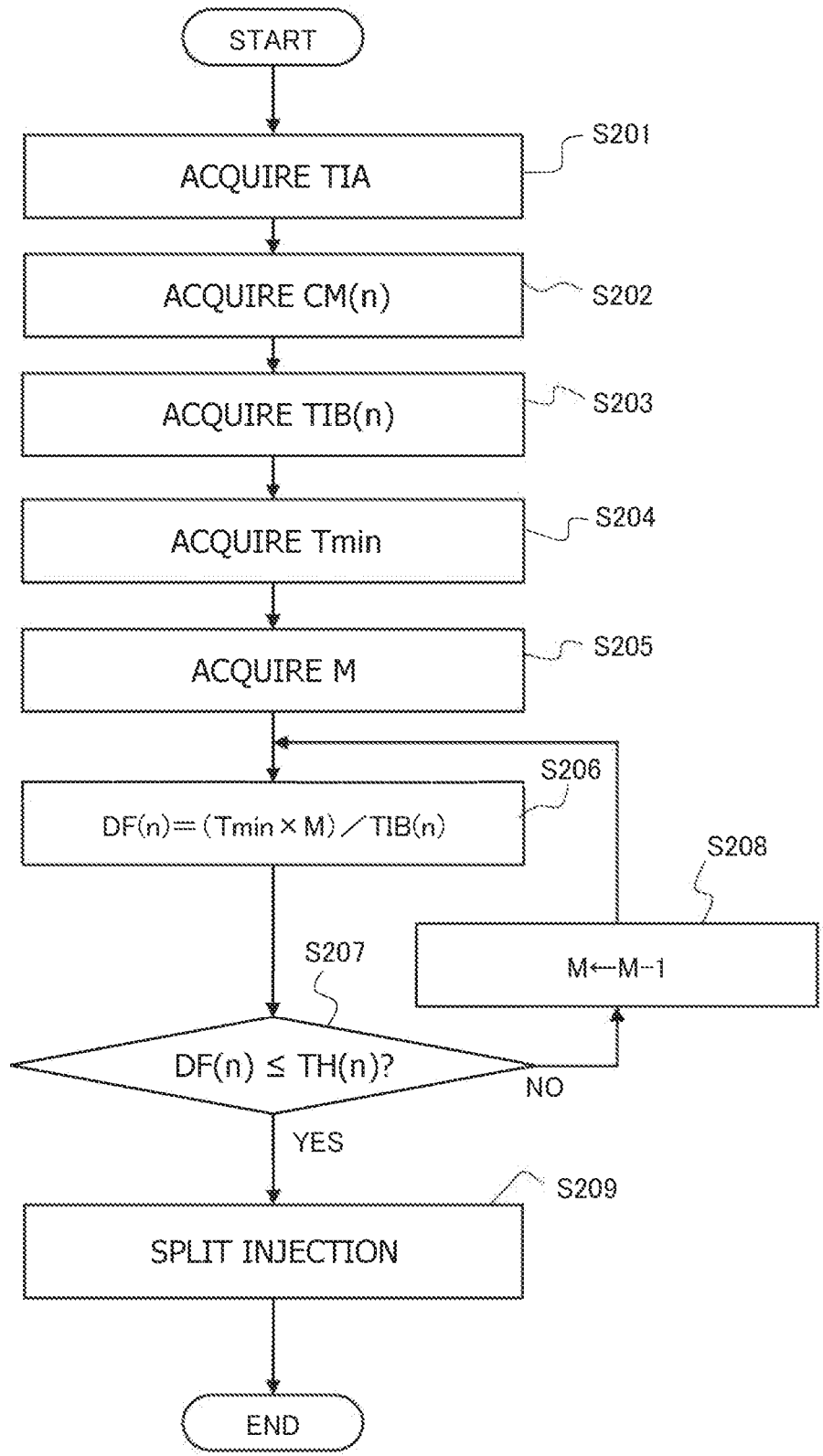
FIG. 11 is a flowchart showing a second embodiment of processing for setting the split number.

FIG. 11 is a flowchart showing the second embodiment of processing for setting the split number.

The processes that control device 51 performs in steps S201 to S205 of the flowchart shown in FIG. 11 are substantially the same as those of steps S101 to S105 of the flowchart shown in FIG. 8 respectively. Thus, detailed discussions therefore will be omitted below.

In the flowchart of FIG. 11, step S201 functions as the basic pulse width setting unit for specifying basic pulse width TIA, step S203 functions as the pulse width correcting unit for correcting basic pulse width TIA by cylinder-specific correction value CM(n) to obtain cylinder-specific pulse width TIB(n), and steps S205 to S208 function as the split number setting unit for specifying the split number of split injection.

Control device 51 calculates cylinder-specific split coefficient DF(n) using minimum pulse width Tmin, target split number M, and cylinder-specific pulse width TIB(n) according to the equation described below in step S206.

$$DF(n)=(T\min \times M)/TIB(n)$$

The operation then proceeds to step S207, in which control device 51 compares cylinder-specific split coefficient DF(n) obtained in S206 with cylinder-specific determination value TH(n) and determines whether or not split coefficient DF(n) is equal to or less than determination value TH(n) for each cylinder.

Here, cylinder-specific determination value TH(n) as a determination reference value that is used in the comparison with split coefficient DF(n) is a value that is modified based on cylinder-specific correction value CM(n).

If it is determined that cylinder-specific split coefficient DF(n) is equal to or less than cylinder-specific determination value TH(n) for a specific cylinder in step S207, control device 51 does not modify, for this cylinder, target split number M used in the calculation of split coefficient DF(n) in step S206, and the operation proceeds to step S209 (the split injection controlling unit), in which control device 51 controls split injection in a manner similar to step S109.

On the other hand, if it is determined that cylinder-specific split coefficient DF(n) is greater than cylinder-specific determination value TH(n) for a specific cylinder in step S207, the operation proceeds to step S208, in which control device 51 performs the updating processing for this cylinder to decrease target split number M used in the calculation of split coefficient DF(n) in step S206 by one. The operation then returns to step S206 for calculating split coefficient DF, in which control device 51 specifies target split number M such that cylinder-specific split coefficient DF(n) is equal to or less than cylinder-specific determination value TH(n).

In other words, control device 51 determines whether or not target split number M is acceptable based on minimum pulse width Tmin and the pulse width per one injection of split injection calculated from cylinder-specific pulse width TIB(n) and target split number M, and control device 51 modifies target split number M based on the result of the acceptance determination for each cylinder.

FIG. 12 illustrates examples of cylinder-specific determination value TH(n) and cylinder-specific correction value CM(n) according to the second embodiment.

In examples in FIG. 12, basic pulse width TIA is 1210 μs, correction value CM(1) of the first cylinder is −30 μs, correction value CM(2) of the second cylinder is 0 μs, correction value CM(3) of the third cylinder is 30 μs, and correction value CM(4) of the fourth cylinder is 10 μs.

Therefore, cylinder-specific pulse width TIB(1) of the first cylinder is 1180 μs, cylinder-specific pulse width TIB(2) of the second cylinder is 1210 μs, cylinder-specific pulse width TIB(3) of the third cylinder is 1240 μs, and cylinder-specific pulse width TIB(4) of the fourth cylinder is 1220 μs.

Furthermore, with respect to cylinder-specific split coefficient DF(n) calculated in S206, split coefficient DF(1) of the first cylinder is 1.02, split coefficient DF(2) of the second cylinder is 0.99, split coefficient DF(3) of the third cylinder is 0.97, and split coefficient DF(4) of the fourth cylinder is 0.98.

Here, for the second cylinder, cylinder-specific correction value CM(2) is specified as zero, cylinder-specific determination value TH(2) is 1.0. For the first cylinder, cylinder-specific correction value CM(1) is a negative value, cylinder-specific determination value TH(1) is 1.03, which is greater than 1.0. For the third cylinder, cylinder-specific correction value CM(3) is a positive value, cylinder-specific determination value TH(3) is 0.98, which is less than 1.0.

Furthermore, for the fourth cylinder, cylinder-specific correction value CM(4) is a positive value and the absolute value thereof is less (is closer to zero) than that of cylinder-specific correction value CM(3), cylinder-specific determination value TH(4) is 0.99, which is less than 1.0 and greater than determination value TH(3).

Specifically, if calculating cylinder-specific split coefficient DF(n) using cylinder-specific pulse width TIB(n) obtained by the correction based on cylinder-specific correction value CM(n), determination value TH(n) is modified for each cylinder so as to decrease influence of cylinder-specific correction value CM(n) on the comparison of split coefficient DF(n) with determination value TH(n).

If cylinder-specific pulse width TIB(n) obtained by the correction based on correction value CM(n) is shorter than basic pulse width TIA, control device 51 modifies determination value TH (in other words, a determination reference value) in the direction of allowing a shorter pulse width to be acceptable as the pulse width for one injection of split injection.

In examples in FIG. 12, for example, split coefficient DF(1) calculated based on cylinder-specific pulse width TIB(1) of the first cylinder is 1.02. If this split coefficient DF(1) is compared with determination value TH, which is 1.0, it is determined that split coefficient DF is greater than determination value TH, and thus, target split number M, the initial value of which is 3, is decreased by one and becomes 2.

On the other hand, for the second to the fourth cylinders, their respective split coefficient DF(n) calculated based on cylinder-specific pulse widths TIB(n) is less than 1.0. If determination value TH is 1.0, target split number M is maintained at the initial value, which is 3.

Specifically, if target split number M is specified for each cylinder based on the comparison of cylinder-specific split coefficient DF(n) calculated based on cylinder-specific pulse width TIB(n) with determination value TH (TH=1.0) the same for each cylinder, the set target split numbers M may differ depending on each cylinder due to the correction by cylinder-specific correction value CM(n).

In this case, some of the cylinders with a decreased split number cannot obtain sufficient effects of split injection. Furthermore, differences in the split numbers among the cylinders results in variations in combustion performance among the cylinders.

Accordingly, control device 51 modifies determination value TH(n) for each cylinder based on cylinder-specific correction value CM(n) so that if target split number M is specified for each cylinder based on cylinder-specific split coefficient DF(n) calculated using cylinder-specific pulse width TIB(n), target split number M of some cylinders are not decreased unnecessary and the set target split numbers M do not differ depending on each cylinder.

Thus, it is possible to execute split injection based on the split number that is as close as possible to the initial value of target split number M according to the operation state of internal combustion engine 11 and is also the same among the cylinders while suppressing injection variations among cylinders by the correction of the pulse width with cylinder-specific correction value CM(n).

Figure 13:
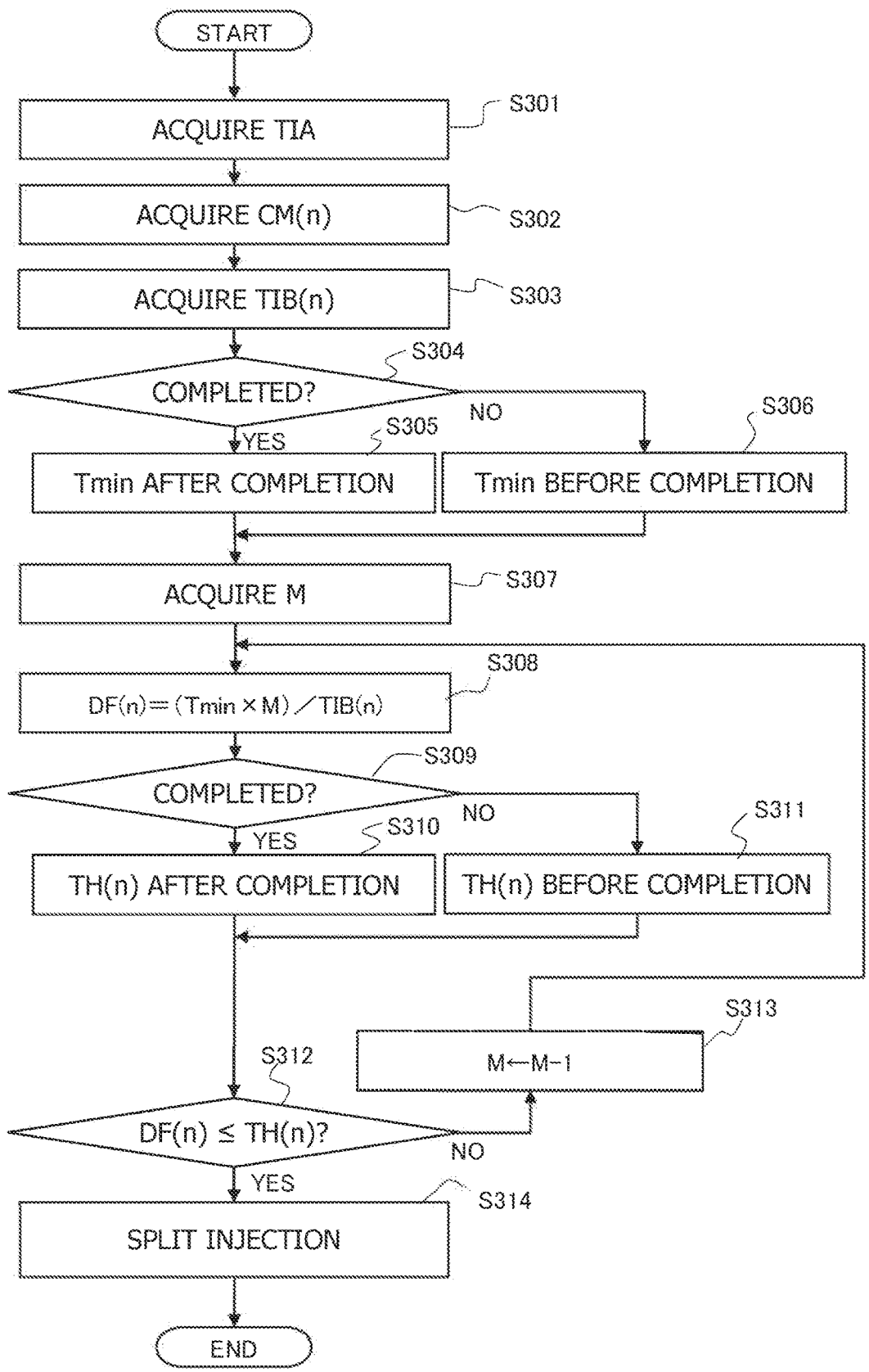
FIG. 13 is a flowchart showing a third embodiment of processing for setting the split number.

FIG. 13 is a flowchart showing the third embodiment of processing for setting the split number.

Control device 51 reads basic pulse width TIA corrected according to the pressure of the fuel in step S301 (the basic pulse width setting unit).

Next, in step S302 (the correction value acquiring unit), control device 51 reads the learned cylinder-specific correction value CM(n).

In step S303 (the pulse width correcting unit), control device 51 then calculates cylinder-specific pulse width TIB(n) by correcting basic pulse width TIA with cylinder-specific correction value CM(n).

Control device 51 then performs processing for modifying minimum pulse width Tmin in steps S304 to S306 (minimum pulse width modifying unit) based on whether or not learning of cylinder-specific correction value CM(n) has been completed.

In step S304, control device 51 determines whether or not learning of cylinder-specific correction value CM(n) has been completed, in other words, whether or not measurement of the valve-closing response time of each fuel injection valve 21 and calculation of cylinder-specific correction value CM(n) based on the result of the measurement have been completed.

If the learning of cylinder-specific correction value CM(n) has been completed, the operation proceeds to step S305, in which control device 51 selects minimum pulse width Tmin that is adapted for a state in which the pulse width is corrected by cylinder-specific correction value CM(n).

On the other hand, if the learning of cylinder-specific correction value CM(n) has not been completed, the operation proceeds to step S306, in which control device 51 selects minimum pulse width Tmin that is adapted for a state in which the pulse width is not corrected by cylinder-specific correction value CM(n).

For example, with the properties shown in FIG. 6 and FIG. 7, minimum pulse width Tmin selected in step S305 is 400 µs, and minimum pulse width Tmin selected in step S306 is 600 µs.

Specifically, correcting the pulse width by cylinder-specific correction value CM(n) can make injection variations among the cylinders smaller, which can suppress injection variations to be within an acceptable range even if a fuel injection is executed based on a shorter pulse width.

Accordingly, if the learning of cylinder-specific correction value CM has been completed and it becomes possible to perform the correction for suppressing injection variations, control device 51 modifies minimum pulse width Tmin to be shorter than that of before completion of learning.

The operation then proceeds to step S307, in which control device 51 specifies the initial value of target split number M based on the operation state of internal combustion engine 11, for example the engine rotation speed and the engine load.

In step S308, control device 51 then calculates cylinder-specific split coefficient DF(n) using minimum pulse width Tmin, target split number M, and cylinder-specific pulse width TIB(n) according to the equation below.

$$DF(n)=(T\min \times M)/\mathrm{TIB}(n)$$

The operation then proceeds to step S309, in which control device 51 determines whether or not learning of cylinder-specific correction value CM(n) has been completed in a similar manner to step S304.

If the learning of cylinder-specific correction value CM(n) has been completed, the operation proceeds to step S310, in which control device 51 selects, as cylinder-specific determination value TH(n) of a determination reference value that is compared with split coefficient DF(n), determination value TH(n) that is adapted for a state in which the pulse width is corrected by cylinder-specific correction value CM(n), in other words, determination value TH(n) that is modified for each cylinder based on cylinder-specific correction value CM(n).

On the other hand, if the learning of cylinder-specific correction value CM(n) has not been completed, the operation proceeds to step S311, in which control device 51 selects, as determination value TH(n), determination value TH(n) (TH(n)=1.0) that is adapted for a state in which the pulse width is not corrected by cylinder-specific correction value CM(n).

After the processing for switching and setting of determination value TH, the operation proceeds to step S312, in which control device 51 compares cylinder-specific split coefficient DF(n) with determination value TH(n).

If it is determined that split coefficient DF(n) is equal to or less than determination value TH(n) for a specific cylinder, control device 51 does not modify target split number M for this cylinder, and the operation proceeds to step S314, in which control device 51 executes split injection control based on this target split number M.

On the other hand, if it is determined that split coefficient DF(n) is greater than determination value TH(n) for a specific cylinder, the operation proceeds to step S313, in which control device 51 performs the updating processing to decrease target split number M by one for this cylinder. The operation then returns to step S308, in which control device 51 calculates split coefficient DF(n) based on the updated target split number M.

FIG. 14 illustrates, as a representative example of switching and setting of minimum pulse width Tmin and determination value TH(n) based on whether or not the learning of cylinder-specific correction value CM(n) has been completed, an example with respect to the first cylinder of fuel injection valve 21 having the lower end value of spring loading (lower end one).

Correction value CM(n) is maintained at the initial value, which is zero, until the learning of cylinder-specific correction value CM(n) is completed. For example, if basic pulse width TIA is 1210 µs, cylinder-specific pulse width TIB(1) of the first cylinder is set to be the same as basic pulse width TIA, which is 1210 µs.

If the learning of cylinder-specific correction value CM(n) has not been completed, in other words, if the correction of the pulse width by correction value CM(n) is not substantially performed, minimum pulse width Tmin is specified as 600 µs, and determination value TH(n) is 1.0.

In such a numerical example, if the initial value of target split number M is 3, split coefficient DF(1) of the first cylinder is 1.49, and control device 51 accordingly determines that split coefficient DF(1) is greater than determination value TH(1) and decreases target split number M by one to become 2.

On the other hand, if the learning of cylinder-specific correction value CM(n) has been completed, or if the correction of the pulse width by correction value CM(n) is substantially performed, with the lower limit of the pulse width that can place injection variation in an acceptable range being 400 µs, minimum pulse width Tmin is switched from 600 µs to 400 µs.

Furthermore, assume here that correction value CM(1) of the first cylinder is −30 µs, and that determination value TH for the first cylinder is switched from 1.0 to 1.03 based on this correction value CM(1).

In this case, split coefficient DF(1) of the first cylinder is calculated as 1.02 by using target split number M=3. Accordingly, control device 51 determines that split coefficient DF(1) is equal to or less than determination value TH(1) and ultimately sets target split number M as 3 and executes split injection control.

Figure 15:
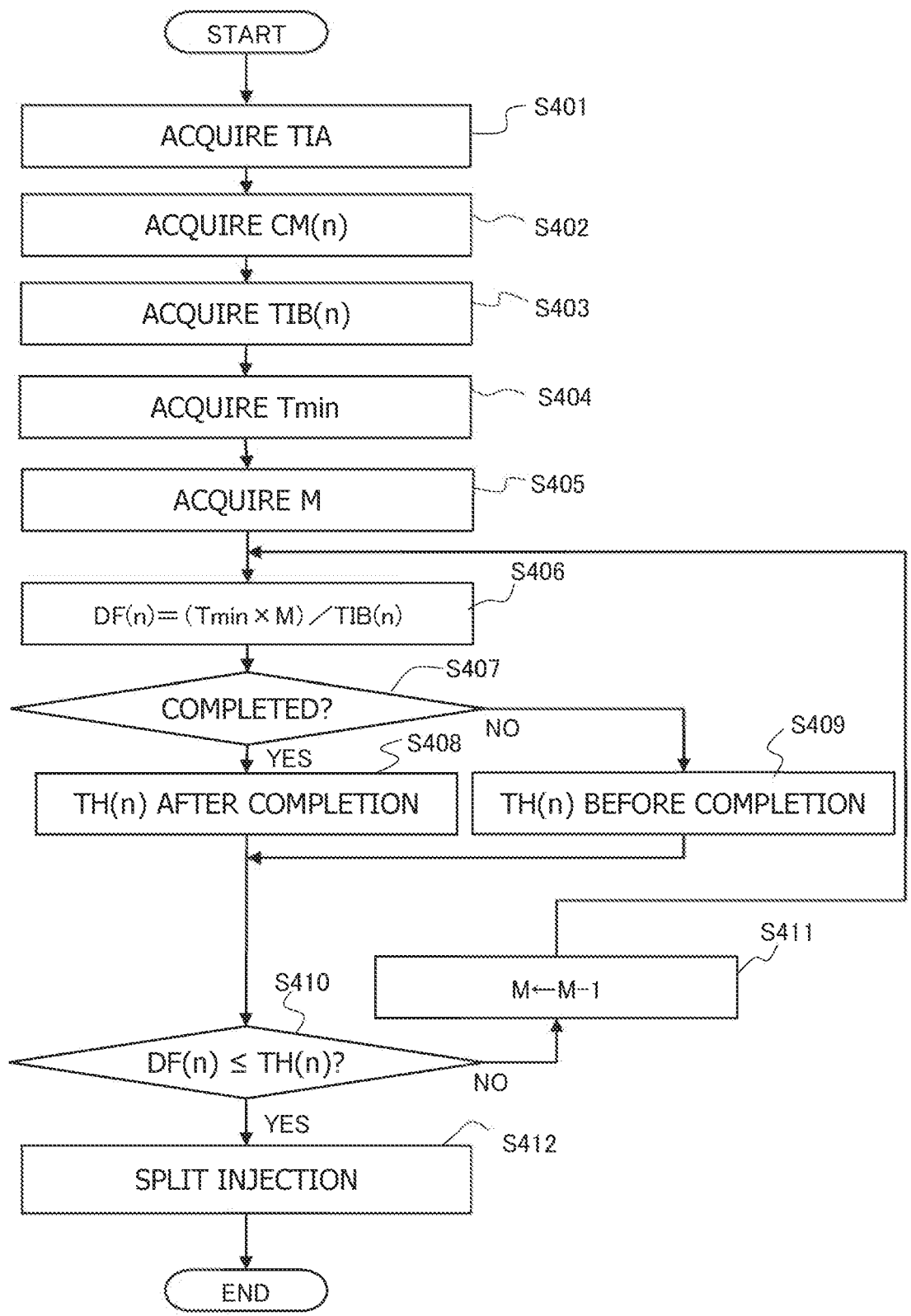
FIG. 15 is a flowchart showing a fourth embodiment of processing for setting the split number.

FIG. 15 is a flowchart showing the fourth embodiment of processing for setting the split number.

In the third embodiment shown in the flowchart of FIG. 13, minimum pulse widths Tmin and determination values TH(n) are switched respectively based on whether or not the learning of cylinder-specific correction value CM(n) has been completed. On the other hand, in the fourth embodiment shown in the flowchart of FIG. 15, in which the processing for switching and setting is performed on determination values TH(n), but is not performed on minimum pulse widths Tmin, the obtained result of setting the split number is similar to that of the third embodiment.

Control device 51 performs processes in step S401 (the basic pulse width setting unit), step S402 (the correction value acquiring unit), and in step S403 (the pulse width correcting unit) that are substantially the same as those of steps S301 to step S303, respectively.

The operation then proceeds to step S404, in which control device 51 specifies minimum pulse width Tmin.

Here, regardless whether or not learning of cylinder-specific correction value CM(n) has been completed, control device 51 specifies, as minimum pulse width Tmin, the lower limit of the pulse width that can make injection variations be in an acceptable range (for example, 400 µs) in a state in which the learning of cylinder-specific correction value CM(n) has been completed and in which the correction of the pulse width by correction value CM(n) is substantially performed.

The operation then proceeds to step S405, in which control device 51 specifies the initial value of target split number M based on the operation state of internal combustion engine 11, for example, the engine rotation speed and the engine load.

Next, in step S406, control device 51 calculates cylinder-specific split coefficient DF(n) using minimum pulse width Tmin that is adapted for a state in which cylinder-specific correction value CM(n) has been learned, target split number M, and cylinder-specific pulse width TIB(n) according to the equation below.

$$DF(n)=(T\min \times M)/TIB(n)$$

The operation proceeds to step S407, in which control device 51 determines whether or not cylinder-specific correction value CM(n) has been learned.

If it is determined that cylinder-specific correction value CM(n) has been learned, the operation proceeds to step S408, in which control device 51 selects determination value TH(n) that is adapted for a state in which the pulse width is corrected by cylinder-specific correction value CM(n).

On the other hand, if it is determined that the learning of cylinder-specific correction value CM(n) has not been completed, the operation proceeds to step S409, in which control device 51 selects determination value TH(n) that is adapted for a state in which the pulse width is not corrected by cylinder-specific correction value CM(n).

After specifying determination value TH(n) in step S408 or step S409, the operation proceeds to step S410, in which control device 51 compares split coefficient DF(n) with determination value TH(n).

If it is determined that split coefficient DF(n) is equal to or less than determination value TH(n) for a specific cylinder, control device 51 does not modify target split number M for this cylinder, and the operation proceeds to step S412, in which control device 51 executes split injection control based on this target split number M.

On the other hand, if it is determined that split coefficient DF(n) is greater than determination value TH(n) for a specific cylinder, the operation proceeds to step S411, in which control device 51 performs the updating processing to decrease target split number M by one for this cylinder. The operation then returns to step S406, in which control device 51 calculates split coefficient DF(n) again based on the updated target split number M.

FIG. 16 illustrates, as a representative example, according to the fourth embodiment, of switching and setting of determination value TH(n) based on whether or not the learning of cylinder-specific correction value CM(n) has been completed, an example with respect to the first cylinder of fuel injection valve 21 having the lower end value of spring loading (lower end one).

Correction values CM(n) are all maintained at the initial value, which is zero, until the learning of cylinder-specific correction value CM(n) is completed. For example, if basic pulse width TIA is 1210 µs, cylinder-specific pulse width TIB(1) of the first cylinder is set to be the same as basic pulse width TIA, which is 1210 µs.

If the learning of cylinder-specific correction value CM(n) has not been completed, in other words, if the correction of the pulse width by correction value CM(n) is not substantially performed, the lower limit of the pulse width that can make injection variations be in an acceptable range is 600 µs. On the other hand, if the learning of cylinder-specific correction value CM(n) has been completed and the correction of the pulse width by correction value CM(n) is substantially performed, the lower limit of the pulse width that can make injection variations be in an acceptable range is 400 µs.

However, in the fourth embodiment, regardless whether or not learning of cylinder-specific correction value CM(n) has been completed, minimum pulse width Tmin is set as 400 µs, which is a value adapted for a state in which the learning of cylinder-specific correction value CM(n) has been completed.

Specifically, in the fourth embodiment, even before the learning of cylinder-specific correction value CM(n) has been completed, minimum pulse width Tmin that is adapted for a state in which the learning of cylinder-specific correction value CM(n) has been completed is used.

In a state before the learning of cylinder-specific correction value CM(n) has been completed, if minimum pulse width Tmin (=400 µs) adapted for a state in which the learning of cylinder-specific correction value CM(n) has been completed is used and determination values TH(n) are all specified as 1.0 in a similar manner to the third embodiment, split injection might be executed at the pulse width per one injection that is shorter than 600 µs, even though the lower limit of the pulse width that can actually make injection variations be in an acceptable range is 600 µs.

For example, if the learning of cylinder-specific correction value CM(n) has not been completed, and when cylinder-specific pulse width TIB(n) is the same as basic pulse width TIA, which is 1210 μs, split coefficient DF(n) is calculated to be 0.99 on the condition in which target split number M=3, and minimum pulse width Tmin=400 μs, and thus, target split number M is ultimately specified as 3.

However, if cylinder-specific pulse width TIB is 1210 μs (TIB=TIA), specifying target split number M as 3 results in executing split injection based on the pulse width per one injection of shorter than 600 μs, leading to injection variations exceeding the acceptable range.

Accordingly, in a state before the learning of cylinder-specific correction value CM(n) has been completed, control device 51 specifies determination value TH(n) to be less than 1.0 so as to prevent the pulse width per one injection of split injection from being shorter than 600 μs.

In the example shown in FIG. 16, control device 51 specifies determination value TH(n) as 0.67 in step S409 if the learning of cylinder-specific correction value CM(n) has not been completed.

If the learning of cylinder-specific correction value CM(n) has not been completed, and when split coefficient DF(n) is calculated as 0.99 on the condition in which cylinder-specific pulse width TIB(n)=1210 μs, target split number M=3, and minimum pulse width Tmin=400 μs, it is determined, with determination value TH(n) being 0.67, that split coefficient DF(n) is greater than determination value TH(n).

Accordingly, target split number M is updated from 3 to 2, and thus, split coefficient DF(n) is calculated as 0.66 by using target split number M=2. It is then determined that split coefficient DF(n) is less than determination value TH(n), and target split number M is ultimately set as 2 for all the cylinders.

Split injection based on target split number M of 2, which allows the pulse width per one injection to be 600 μs or longer, can place injection variations among the cylinders in an acceptable range.

On the other hand, if the learning of cylinder-specific correction value CM(n) has been completed, determination value TH(n) of each cylinder is modified from 1.0 individually based on cylinder-specific correction value CM(n).

For example, with respect to the first cylinder of fuel injection valve 21 having the lower end value of spring loading (lower end one), even if determination value TH(1) is modified to be a value greater than 1.0 (for example, 1.03) and split coefficient DF(1) is calculated based on cylinder-specific pulse width TIB(1) obtained by the correction to decrease by the cylinder-specific correction value CM(1), it is determined that split coefficient DF(1) is equal to or less than determination value TH(1), preventing target split number M from being decreased.

The technical concepts described in the first to the fourth embodiments described above may be used in combination with each other as necessary, as long as no conflict arises.

Furthermore, although the present invention has been described in detail with reference to the preferred embodiments, it is apparent that the embodiments may be modified in various forms by one skilled in the art based on the fundamental technical concepts and teachings of the present invention.

For example, a method of correcting the pulse width for each cylinder is not limited to a method of specifying zero as correction value CM(n) of fuel injection valve 21 having the spring loading of a median value.

Control device 51 may specify zero as correction value CM(n) of fuel injection valve 21 having an upper end value of spring loading to specify a negative value as correction values CM(n) of other fuel injection valves 21, or may specify zero as correction value CM(n) of fuel injection valve 21 having a lower end value of spring loading to specify a positive value as correction values CM(n) of other fuel injection valves 21.

Control device 51 may also determine fuel injection valve 21 of the first cylinder as a reference fuel injection valve 21, for example, and learn correction value CM(n) for each cylinder so that the injection amounts of fuel injection valves 21 of other cylinders are equal to that of fuel injection valve 21 of the first cylinder.

REFERENCE SYMBOL LIST

11 Internal combustion engine
21 Fuel injection valve
51 Control device (Fuel injection control device)

The invention claimed is:

1. A fuel injection control device for an internal combustion engine having a plurality of cylinders and a fuel injection valve provided for each cylinder,
the fuel injection control device comprises:
a basic pulse width setting unit that determines a basic pulse width of a drive pulse signal to be output to the fuel injection valves based on an operation state of the internal combustion engine,
a pulse width correcting unit that corrects the basic pulse width by a cylinder-specific correction value that is based on injection variations among the fuel injection valves and sets a cylinder-specific pulse width,
a split number setting unit that sets a split number of split injection, the split number setting unit being configured to determine whether or not the split number is acceptable based on a pulse width per one injection calculated from the cylinder-specific pulse width and the split number and on a minimum pulse width that is a lower limit of a pulse width of the drive pulse signal, to modify the split number based on a result of the acceptance determination, and to modify an acceptance determination reference value which is used in the acceptance determination based on the correction value for each cylinder, and
a split injection controlling unit that executes split injection based on the split number, the basic pulse width, and the correction value for each cylinder.

2. The fuel injection control device for the internal combustion engine according to claim 1, wherein the split number setting unit is configured to modify, when the cylinder-specific pulse width obtained by the correction based on the correction value is shorter than the basic pulse width, the acceptance determination reference value in a direction of allowing a shorter pulse width to be acceptable as the pulse width for one injection of split injection.

3. The fuel injection control device for the internal combustion engine according to claim 1, the fuel injection control device further comprising a correction value leaning unit that learns the correction value, and a minimum pulse width modifying unit that modifies the minimum pulse width based on whether or not learning of the correction value by the correction value leaning unit has been completed.

4. The fuel injection control device for the internal combustion engine according to claim 1,
wherein the fuel injection control device further comprises a correction value leaning unit that learns the correction value, and wherein the split number setting unit modifies the acceptance determination reference value based on whether or not learning of the correction value by the correction value leaning unit has been completed.

5. The fuel injection control device for the internal combustion engine according to claim 1,
wherein the split number setting unit sets a target value of the split number based on the operation state of the internal combustion engine, and
wherein the split number setting unit modifies the split number based on the result of the acceptance determination by using the target value as an initial value.

6. A fuel injection control device for an internal combustion engine having a plurality of cylinders and a fuel injection valve provided for each cylinder,
the fuel injection control device comprises:
a basic pulse width setting unit that determines a basic pulse width of a drive pulse signal to be output to the fuel injection valves based on an operation state of the internal combustion engine,
a correction value acquiring unit that acquires a cylinder-specific correction value for correcting a pulse width of the drive pulse signal based on injection variations among the fuel injection valves,
a split number setting unit that sets a split number of split injection, the split number setting unit being configured to determine whether or not the split number is acceptable based on a pulse width per one injection calculated from the basic pulse width and the split number and on a minimum pulse width that is a lower limit of a pulse width of the drive pulse signal, and to set the split number based on a result of the acceptance determination, and
a split injection controlling unit that executes split injection based on the split number, the basic pulse width, and the correction value for each cylinder.

7. A fuel injection control method for an internal combustion engine, the internal combustion engine having a plurality of cylinders and a fuel injection valve provided for each cylinder,
wherein the fuel injection control method comprises
a first step of determining a basic pulse width of a drive pulse signal to be output to the fuel injection valves based on an operation state of the internal combustion engine,
a second step of correcting the basic pulse width by a cylinder-specific correction value that is based on injection variations among the fuel injection valves and setting a cylinder-specific pulse width,
a third step of setting a split number of split injection, the third step including determining whether or not the split number is acceptable based on a pulse width per one injection calculated from the cylinder-specific pulse width and the split number and on a minimum pulse width that is a lower limit of the pulse width of the drive pulse signal, modifying the split number based on a result of the acceptance determination, and modifying an acceptance determination reference value which is used in the acceptance determination based on the correction value for each cylinder, and
a fourth step of executing split injection based on the split number, the basic pulse width, and the correction value for each cylinder.

* * * * *